Patented Feb. 4, 1941

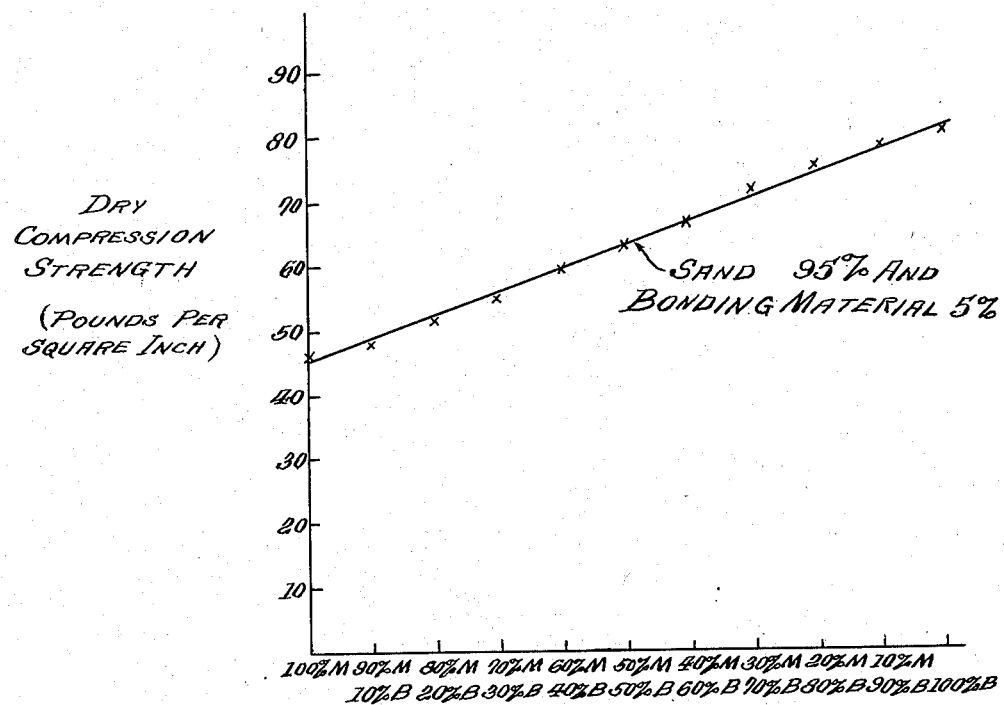

2,230,939

UNITED STATES PATENT OFFICE 2,230,939

COMPOSITION

Norman J. Dunbeck, Eifort, Ohio, assignor, by mesne assignments, to Peerpatco Incorporated, a corporation of Delaware Application September 26, 1939, Serial No. 296,694

7 Claims. (Cl. 22—188)

My invention relates to compositions of matter, and especially to compositions for foundry use.

Among the objects of my invention are the provision of a foundry composition which is strong yet permeable to the fumes and gases encountered in actual use, which may be readily and accurately prepared so as to have any desired dry strength according to the needs of the particular type of casting being made, which, at the same time, has a satisfactorily high green strength, which has a high sintering point, which does not cake or harden in use, which is easily recovered after use and which may be repeatedly employed to give sound high grade castings.

Other objects in part will be obvious and in part pointed out hereinafter.

The invention accordingly consists in the combination of elements, mixture of materials and composition of ingredients, and in the several steps and the relation of each of the same to one or more of the others as described herein, the scope of the application of which is indicated in the following claims.

The single figure of the drawing illustrates the change in dry strength of a mold composition in accordance with my invention with respect to a change in the proportions of the ingredients of the binding agent used.

In present foundry practices, a certain amount of bonding clay is added to silica sand in forming a mold. A small amount of the clay is mixed into clean silica sand, which is tempered with water to form a moist workable mass. A certain amount of burnt sand may be used as a substitute for a part of the clean sand employed.

The foundry composition is rammed about a pattern placed within a molding flask. The clay present in the mixture gives strength to the upper half of the mold, which is contained in the cope, to prevent destruction of the mold in separating it to remove the pattern.

Several types of bonding clays are now in use. The fire clays, largely comprising kaolinite, but also including montmorillonite and beidellite, are probably most prevalent. Also, certain non-refractory clays are used for some classes of work. They are generally of the glacial age and predominate in minerals of the sericite type. Certain stratified clays of greater geological age also are included in this type. In these clays there is a large proportion of the mineral beidellite.

The refractory and non-refractory clays are available in numerous localities throughout the United States. However, usage of such clays increases the strength of a mold only a limited amount. Furthermore, the quantity of such clays required for a substantial strength tends to severely curtail the permeance of the mold. This porosity or permeance is essential to a proper elimination of fumes evolved from the contact of hot metal with the mold walls. Hence the presence of a large amount of clay is not desirable.

Where a clay, such as fire clay, is employed as the bonding material, the amount required ranges from 10% to 30% of the mass of sand, depending on the quality of the sand and upon the quality of the clay. Where bentonite, for example a clay containing approximately 20% of alumina ($Al_2O_3$) and 63% of silica ($SiO_2$), is used separately or in combination with ordinary clay as the bonding agent, as disclosed in the patent to Hanley No. 1,657,573, the proportion of bonding material may be reduced, thus somewhat increasing the permeability of the mold. This result is also obtained by using as the bonding agent a non-swelling and non-colloidal clay of which montmorillonite is a large constituent, commonly known as Porter's Creek clay, a typical example of which contains approximately 15.6% of alumina ($Al_2O_3$) and 63% of silica ($SiO_2$), as disclosed in my Patent Number 2,128,404, or by using a non-swelling but colloidal clay consisting largely of montmorillonite, such as Pontotoc, Mississippi, clay, as disclosed in my pending application, Serial Number 254,497, now U. S. Letters Patent 2,180,897, of November 21, 1939.

The advantages of swelling montmorillonite or bentonite binders are well known to the foundry trade. Foundrymen have found, however, that one of its chief disadvantages is its tremendous dry strength. This results in a slow, difficult and costly shake-out of castings because the sand bakes hard in the flasks. The shake-out is expensive, there is abuse of the flasks and the lumpy sand which results is difficult to recover and recondition and retemper. The chief disadvantage, however, is the fact that the sand will not collapse upon the cooling and shrinking of a casting, frequently resulting in cracked castings which are a complete loss.

In certain types of foundry work, such as in forming heavy castings, a high dry strength of the mold is desirable. For this work, bentonite is an excellent bonding material. In other types of work, such as in forming thin metal castings, a relatively low dry strength is preferable in order to avoid cracking of the castings because of a failure of the sand, in an interior section, to collapse upon cooling. For such applications, a non-swelling montmorillonite, whether a non-colloidal clay such as Porter's Creek clay, as described in my Patent Number 2,128,404, above referred to, or a colloidal clay as set forth in my pending application Serial Number 254,497, also referred to above, is suitable.

There is an intermediate class of work in which a medium dry strength of mold is desirable. Such work requires a higher dry strength than that given by non-swelling montmorillonite or by fire clay, but a lower dry strength than that given by swelling colloidal montmorillonite (bentonite). The foundryman has had, therefore, a difficult choice in some cases between not enough dry strength on the one hand and too much dry strength on the other.

In the past, efforts have been made to achieve the desired intermediate dry strength by combining fire clay and bentonite in various proportions. These efforts have not been successful, however, because the results of the mixture were entirely unpredictable. As can be seen from the following table, the combination of low dry strength and high dry strength binders not only did not give intermediate ranges of dry strength but gave an entirely unreliable and unpredictable peak strength which was higher than that of either of the materials when tested separately.

Using a mixture of 95% by weight of Michigan City core sand with 5% bonding material, to which water in the proportion of 3½% of the weight of the mixture is added, the green strengths, the dry compression strengths and the permeabilities resulting from various combinations of fire clay (F) and bentonite (B) are as follows:

| Sand 95%, bonding materials 5%, composition of bonding material | Green strength in pounds per square inch | Dry strength in pounds per square inch | Permeability |
|---|---|---|---|
| 100% F | 2.80 | 30.0 | 150 |
| 80% F, 20% B | 4.58 | 70.6 | 150 |
| 60% F, 40% B | 5.58 | 98.88 | 165 |
| 40% F, 60% B | 6.11 | 102.0 | 165 |
| 20% F, 80% B | 6.84 | 91.8 | 165 |
| 100% B | 7.44 | 76.5 | 160 |

Obviously, such a combination cannot be relied on to obtain any certain intermediate dry strength.

The main object of my invention, therefore, is to provide a mold composition whose constituent parts may be readily varied in proportions so as to give the resultant mixture any desired predetermined dry strength, the composition, when mixed with sand, also giving the mold a desirably high green strength regardless of the proportions used so that an amount of the composition may be used which is relatively small in proportion to the weight of the sand and hence a high mold permeability will be achieved.

I accomplish the desired result by mixing bentonite (B) with a non-swelling montmorillonite (M) in the proper proportions to obtain a given dry strength. As may be seen from an inspection of the following table, whose values are graphically illustrated in the accompanying drawing, the dry strength resulting from the mixture varies in virtually a straight line relationship to the proportions of the two materials. Using as before a mixture of 95% by weight of Michigan City core sand with 5% bonding material to which water in the proportion of 3½% of the weight of the mixture is added, the green strengths, the dry compression strengths and the permeabilities are as follows:

| Sand 95%, bonding material 5%, composition of bonding material | Green strength in pounds per square inch | Dry strength in pounds per square inch | Permeability |
|---|---|---|---|
| 100% M | 11.15 | 45.7 | 180 |
| 90% M, 10% B | 10.64 | 47.0 | 180 |
| 80% M, 20% B | 10.27 | 50.5 | 180 |
| 70% M, 30% B | 10.12 | 54.7 | 180 |
| 60% M, 40% B | 9.88 | 60.2 | 178 |
| 50% M, 50% B | 9.44 | 63.3 | 175 |
| 40% M, 60% B | 9.24 | 65.7 | 172 |
| 30% M, 70% B | 8.72 | 72.7 | 170 |
| 20% M, 80% B | 8.28 | 74.2 | 170 |
| 10% M, 90% B | 7.78 | 74.9 | 165 |
| 100% B | 7.44 | 76.5 | 160 |

In practicing my invention, there is added to clean silica sand, or to silica sand including a certain quantity of burnt sand as desired, a mixture of bentonite and non-swelling montmorillonite in such proportions as to give a desired dry strength of mold, enough of the mixture being added to constitute about 5% by weight of the sand.

Thus, if a dry strength of about 50 pounds per square inch is desired, the materials are mixed in the proportion of 85% non-swelling montmorillonite and 15% bentonite. Similarly, if a dry strength of about 65 pounds per square inch is required, the materials are mixed in the proportions of 46% non-swelling montmorillonite and 54% bentonite.

The whole is mixed in the usual foundry mixers to obtain a fairly uniform constituency. Water is then added in desired amount, ordinarily about 3½% by weight. The mixing is continued, giving a uniform mix of desired strength. This mold mix is then used in preparing a sand mold in accordance with well-known methods. It appears that upon the addition of water a slurry is formed which coats the individual grains of sand.

The green strength of the mold using the above mixtures is high throughout the whole range of proportions. Furthermore, the permeability of the mold is relatively high in all of the possible combinations. These features are added advantages over the fire clay-bentonite combination, particularly when in the latter the proportion of fire clay is relatively high, as in such a combination a larger percentage of the bonding mixture in proportion to the mass of sand must be used to achieve the requisite green strength, and with this the permeability of the mold becomes unsatisfactory. As a result, in the mold composition using the fire clay-bentonite binder, a compromise must be struck between inadequate green strength on the one hand and insufficient permeance on the other.

A valuable advantage of my invention is that a person using the bonding material herein described can definitely predict the dry strength of the mold which will result from any combination of materials he chooses. This invention, therefore, furnishes the foundryman a new and valuable means of controlling the dry strength of his mold. With the desired dry strength, there is a high and substantially uniform green strength. Moreover, excellent permeability is assured. A high recovery of the mold composition likewise is possible.

In accordance with the practice of my invention, a molding material can be prepared so as to be suitable for the particular casting being made. For a heavy casting, such as a machine base, the ingredients are mixed with a large proportion of bentonite, resulting in a mold of high dry strength. For a medium weight casting the ingredients are proportioned about equally to give the mold an intermediate dry strength. At the other extreme in the casting of a light, thin-walled article, it is best to use a relatively small percentage of bentonite and a large percentage of non-swelling montmorillonite. With the latter combination, the dry strength of the mold is nearly the minimum and the casting can contract upon cooling without danger of being cracked by the failure of the walls of the mold to give way sufficiently.

It will be understood that the various ingredients going to make up the mold composition of my invention may be mixed together in any desired sequences. While the amount of bonding material is illustratively given as about 5% of the weight of sand with which it is mixed, it will be understood that good results are obtained when the amount of the bonding material ranges from about 2% to 8% of the sand weight. In fact, these proportions can be extended to ½% to 8% where a part of the sand consists of burnt sand since the bonding material is reversible in character and can be used over again.

Although as illustrative of my invention a mold, comprising silica sand and a combination of bentonite and non-swelling montmorillonite is described, my invention is applicable to like combinations of sand and clay for other foundry uses. These include the preparation of cores, both green and dry, and facing sands. Both of these may consist of various combinations of new silica sand, burnt silica sand, new molding sand, burnt molding sand, lake sand or bank sand together with the bonding material to which may be added auxiliary binders in small quantities, such as cereal binders, cement, goulac, pitch or rosin and a casting cleaning element such as sea coal, wood flour or oils. In the practice of my invention the composition is directly added to foundry sands of any type which require strengthening by placing the necessary quantity of composition on each mold, by feeding it directly into sand handling systems, by spreading it over sand heaps or by any other of the methods in common use.

As many possible embodiments may be made of my invention and as many changes may be made in the embodiments hereinbefore set forth, it is to be understood that all matter described herein is to be interpreted illustratively and not in a limiting sense.

I claim:

1. In a composition of matter, a foundry composition comprising in combination, sand, bentonite and a non-swelling clay of which montmorillonite is a large constituent.

2. In a composition of matter, a foundry composition comprising in combination, silica sand, bentonite, and a non-swelling, colloidal clay largely comprising montmorillonite.

3. In a composition of matter, a foundry composition comprising in combination, approximately 92 to 98 per cent silica sand and 8 to 2 per cent of a mixture of bentonite and non-swelling montmorillonite.

4. In a composition of matter, a foundry mold composition comprising in combination, silica sand and a mixture of bentonite and non-swelling montmorillonite in such proportions as to give a desired dry strength of mold.

5. In preparing a mold for foundry purposes, the art which includes mixing with silica sand a binding material comprising bentonite and non-swelling montmorillonite in such relative proportions as to produce a desired dry strength of the mold.

6. In a composition of matter, a foundry binder comprising bentonite and a non-swelling montmorillonite clay.

7. In a composition of matter, a foundry binder comprising a swelling montmorillonite clay and a non-swelling colloidal montmorillonite clay.

NORMAN J. DUNBECK.